United States Patent [19]

Hess

[11] Patent Number: 4,699,325

[45] Date of Patent: Oct. 13, 1987

[54] ROTARY MEAT GRINDER WITH BONE CHIP REMOVAL HUB

[76] Inventor: Craig W. Hess, 3946 Willow Rd., Schiller Park, Ill. 60176

[21] Appl. No.: 886,978

[22] Filed: Jul. 16, 1986

[51] Int. Cl.[4] .............................................. A47J 43/07

[52] U.S. Cl. .............................................. 241/82.5

[58] Field of Search ............................... 241/82.1–82.7

[56] References Cited

U.S. PATENT DOCUMENTS

| | | | |
|---|---|---|---|
| 3,934,827 | 1/1976 | Seydelmann | 241/82.3 |
| 4,004,742 | 1/1977 | Hess | 241/82.5 |
| 4,358,061 | 11/1982 | Richter | 241/82.5 X |

*Primary Examiner*—Mark Rosenbaum

*Attorney, Agent, or Firm*—Basil E. Demeur; Robert E. Knechtel

[57] ABSTRACT

A combination of a perforated plate for a rotary meat grinder and a stud journalled in a cylindrical bore in the plate and adapted for rotatably supporting an auger which impels meat in the direction of the plate and a knife interposed between the auger and the plate in shearing relation to the upstream face of the plate. The plate has a disk-like body portion with an integral generally cylindrical hub portion projecting downstream from the body and a counterbore adjacent to its upstream face and surrounding the cylindrical bore, and a stud shaft portion journalled in the cylindrical bore defines with the walls of the counterbore an annular bone-collecting pocket around the shaft portion. A discharge passage radially offset from the first bore extends from the pocket through the hub and a discharge tube secured to the downstream end of the hub receives bone particles discharged from the pocket in the grinder.

5 Claims, 4 Drawing Figures

FIG. 1
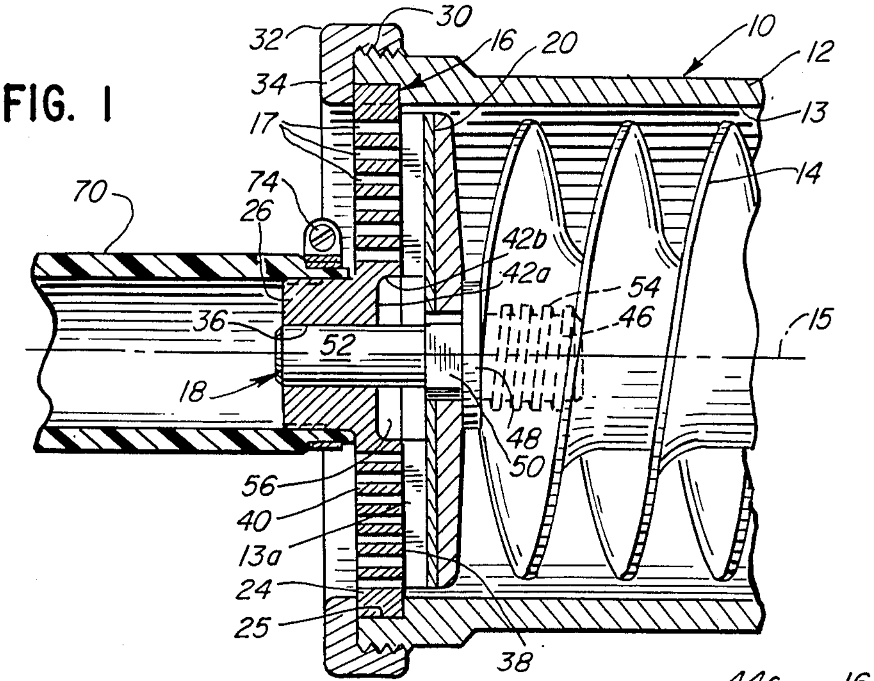
FIG. 2
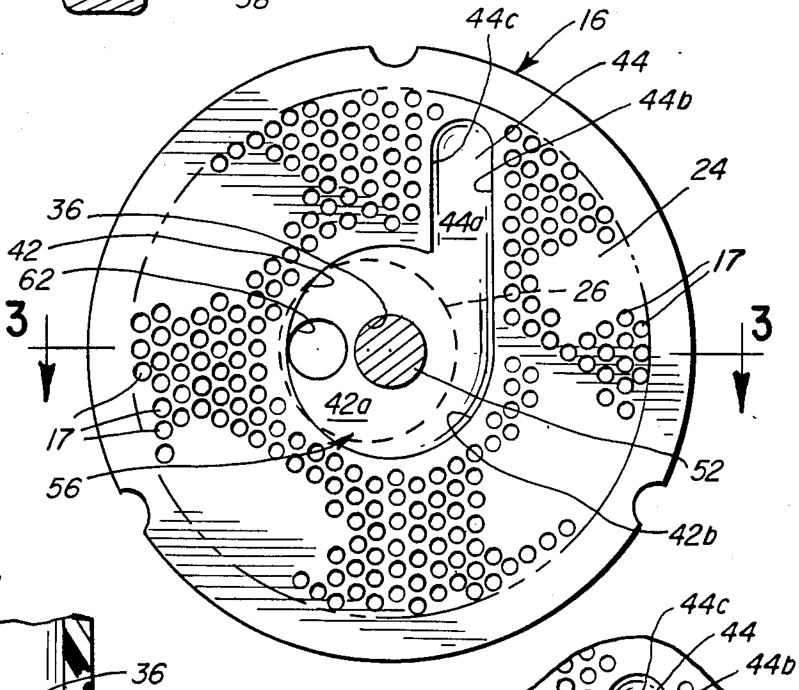
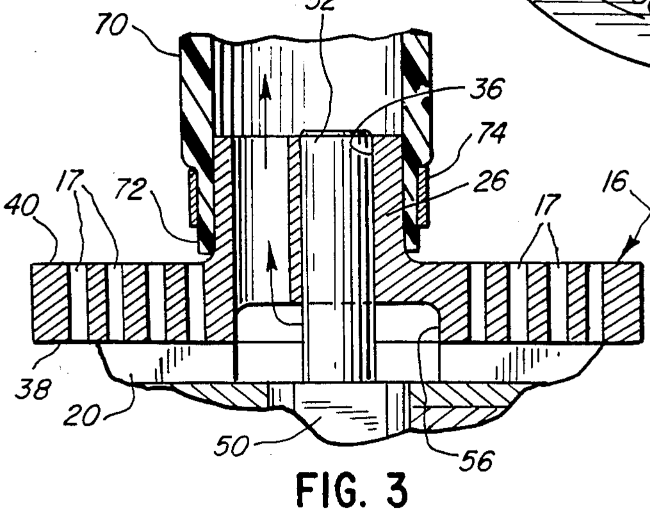
FIG. 3
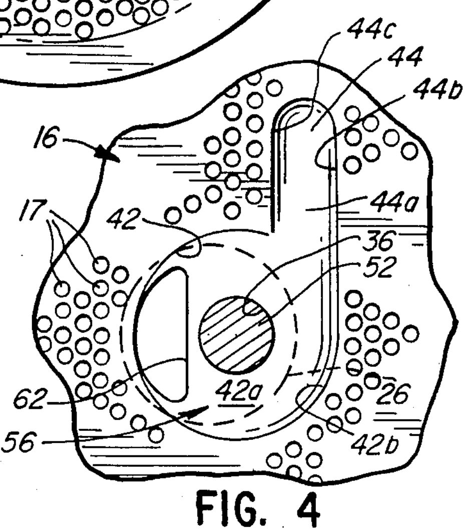
FIG. 4

ROTARY MEAT GRINDER WITH BONE CHIP REMOVAL HUB

FIELD OF THE INVENTION

The present invention relates generally to parts for a rotary meat grinder and, more particularly concerns a combination of a perforated plate and a stud which are employed in the grinder and function to collect and discharge bone particles separately from the ground meat.

BACKGROUND OF THE INVENTION

Meat grinders or choppers which rotate at relatively low speeds, e.g., about 150 to 250 r.p.m., are used for the preparation of hamburger meat and other products. The meat supplied to the grinder is accompanied by bone particles and other hard particles, such as gristle, which are referred to herein collectively as "bone particles." Perforated plates constructed for collecting the bone particles separately from the meat are disclosed in U.S Pat. No. 3,934,827, U.S. Pat. No. 4,004,742 and my prior U.S. application Ser. No. 328,902, filed Dec. 9, 1981, now abandoned. The former patent also discloses structure for discharging bone particles from the grinder as they are collected.

The structure of U.S. Pat. No. 4,004,742 includes a perforated plate and a stud having a shaft portion journalled in a cylindrical bore in the plate. A counterbore adjacent to the upstream face of the plate and surrounding the cylindrical bore forms an annular bone-collecting pocket around the shaft portion. The bone particles are retained in the grinder as they are collected, and the collected particles are emptied periodically. The structure of the latter patent is capable of producing ground meat which is very low in bone particles, and only a small amount of meat is lost with the bone particles which are removed separately.

The structure disclosed in my aforementioned application Ser. No. 328,902 constitutes an improvement on the structure disclosed in my U.S. Pat. No. 4,004,742 wherein the discharge of the bone particles is accomplished in the application with but a slight change in the structure disclosed in my U.S. Pat. No. 4,004,742. In particular, the shaft portion of the stud is provided with a recess extending continuously therealong between the upstream and downstream faces of the perforated plate for discharging from the grinder the bone particles which collect in the pocket around the shaft portion.

The combination of the perforated plate and the grooved stud provided by the structure of the aforementioned application, now abandoned, may be employed in all domestic meat grinders having die plates of from 5 to more than 16 inches in diameter and a shaft of at least ½ inch in diameter. Because of this arrangement, opening the machine periodically to remove bone particles and the accompanying down time are substantially obviated and no parts additional to those previously employed are required in such medium and large size meat grinders.

While the foregoing arrangement has been used successfully in removing bone chips in meat grinding machines which have relatively large diameter cutting plates and hence, large diameter shafts which will accommodate the necessary peripheral groove, it has been found that in smaller size grinding machines, the shafts are not of sufficient diameter to permit the formation of a large enough longtitudinal peripheral groove in order to allow the passage of bone chips. Moreover, forming the peripheral grooves in the shafts, particularly when made in helical form, involves relatively expensive machining operations and, depending upon the shape of the peripheral groove, it can experience excessive wear which necessitates replacement of the shaft and/or the die plate from time to time.

OBJECTS AND SUMMARY OF THE INVENTION

It is the primary aim of the present invention to provide a meat grinding machine with a more simplified and inexpensive arrangement for permitting removal of bone chips from an accumulation pocket in the forward face of a die plate.

Another related object is to provide a meat grinding machine as characterized above which has particular utility in meat grinding machines which have relatively small diameter die plates and drive shafts. A further object is to provide a grinding machine with a bone chip removal means of the foregoing type which facilitates operation of the machine without exposing the drive shaft or the supporting bore in the die plate to excessive wear.

According to the present invention there is provided a combination of a perforated plate for a rotary meat grinder and a stud journalled in a cylindrical bore in the plate and adapted for rotatably supporting an auger which impels meat in the direction of the plate and a knife interposed between the auger and the plate in shearing relation to the upstream face of the plate. The plate has a disk-like body portion with an integral generally cylindrical hub portion projecting downstream from the body and a counterbore adjacent to its upstream face and surrounding the cylindrical bore, and a stud shaft portion journalled in the cylindrical bore defines with the walls of the counterbore an annular bone-collecting pocket around the shaft portion. A discharge passage radially offset from the first bore extends from the pocket through the hub and a discharge tube secured to the downstream end of the hub receives bone particles discharged from the pocket in the grinder.

These and other features and advantages of the invention will be more readily apparent upon reading the following description of the preferred embodiments of the invention and upon reference to the accompanying drawings wherein:

BRIEF DESCRIPTION OF THE DRAWINGS

FIG. 1 is a fragmentary vertical longitudinal sectional view of a rotary meat grinder provided with a combination of a perforated die plate and an auger supporting stud in accordance with the present invention;

FIG. 2 is a front elevational view of the perforated die plate of the grinder of FIG. 1;

FIG. 3 is a fragmentary section of the die plate and stud substantially as seen along line 3—3 in FIG. 2; and FIG. 4 is a fragmentary front elevation, similar to FIG. 2, of the perforated die plate illustrating an alternative embodiment of the bone chip discharge passageway of the invention.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DESCRIPTION OF THE PREFERRED EMBODIMENTS

Referring to the drawings, particularly to FIG. 1, a rotary meat grinder 10 incorporates the improvements of the invention, and otherwise is conventional, being of the general type disclosed in U.S. Pat. No. 3,542,104. The illustrative grinder 10 is of the horizontal type, and includes a horizontally disposed or extending tubular casing 12, which forms a supply channel 13. A meat-impelling auger or screw 14 is rotatable in the channel 13 about a longitudinal axis 15. The grinder 10 is supplied with chunks of meat through a hopper, not shown, which is mounted on the casing 12 at its forward end and discharges the meat into the channel 13 and onto the auger 14.

The rear or downstream end of the casing 12 is closed by a perforated plate 16, also sometimes identified as a die plate having a plurality of perforations or holes 17 extending therethrough. The plate 16 and the casing 12 form a grinding chamber 13*a* at the downstream end of the channel 13. The auger 14 is supported at its upstream or forward end for rotation in the casing 12 by a shaft, not shown, which is driven in a conventional manner by an electric motor or other power source, also not shown. The auger 14 is rotatably supported at its downstream or rear end by a coaxial stud or pilot member 18, which is journalled in the plate 16. The stud 18 also supports a rotary knife 20 for rotation in unison with the auger 14. The knife 20 is interposed between the auger 14 and the plate 16, in shearing relation to the plate.

The auger 14 and the knife 20 are rotated in the clockwise direction, as viewed from the upstream end of the auger. Chunks of meat are impelled by the auger 14 through the channel 13, past the knife 20, which operates to cut the meat as described hereinafter, and through the perforations 17 in the plate 16. The ground meat discharged from the plate 16 is collected for use, large quantities being used for making hamburgers. The improvements provided by the invention serve to separate the bone particles from the meat at the grinding chamber 13*a*, and discharge them continuously from the grinder 10.

Referring to FIGS. 1 and 2, the plate 16 includes a cylindrical disk-like body portion 24 and an integral generally cylindrical hub portion 26 projecting rearwardly from the body portion. The rim of the body portion 24 is seated in an annular internal recess 28 at the downstream end of the casing 12. The plate extends transversely across the casing 12, perpendicular to the axis 15 and has an axis coincident therewith. The downstream end of the casing 12 also is provided with an external peripheral threaded portion 30. An internally threaded retainer ring 32 includes an inwardly extending flange 34 which overlies the rim of the plate 16, and the ring threadedly engages the threaded portion 30 of the casing 12, to removably secure the plate to the casing.

A smooth cylindrical bearing bore 36 extends through the plate 16 from its upstream face 38 to its downstream face 40, axially of the plate and of the respective body and hub portions 24 and 26 thereof. A substantially enlarged cylindrical counterbore 42 in the body portion 24 surrounds the bearing bore 36 coaxially therewith and adjacent to the upstream face 38. The counterbore is defined by a transverse circular bottom wall 42*a* and a cylindrical side wall 42*b* perpendicular thereto and spaced from the bore 36.

As shown in FIG. 2, a generally radial bone-separation groove 44 is formed in the upstream face 38 of the plate 16. It should also be appreciated that the groove 44 could be an involute or spiral as described in detail in U.S. Pat. No. 4,004,742. The groove 44 is defined by a transverse imperforate bottom wall 44*a* and by spaced substantially parallel side walls 44*b* and 44*c* perpendicular thereto. The bottom wall 44*a* of the groove and the bottom wall 42*a* of the counterbore lie in the same transverse plane perpendicular to the axis 15 (FIG. 1) of the plate 16, in the preferred illustrative embodiment. The groove 44 has a radially disposed outer end adjacent to the outer periphery of the plate 16, and it terminates at the counterbore 42 in open communication therewith. The groove 44 intersects the side wall 42*b* of the counterbore, with the mouth of the groove directed to discharge material from the groove into the counterbore adjacent to and along the side wall 42*b* of the counterbore, in tangential fashion.

The perforations or holes 17 are formed in the body portion 24 of the die plate 16, and they extend between the upstream and downstream faces of the body portion. Preferably, the perforations 17 are cylindrically shaped or frusto-conically shaped, in the latter case widening in the downstream direction. The perforations 17 are provided substantially throughout the area of the plate 16, except for the bottom walls 42*a* and 44*a* of the counterbore 42 and the groove 44, respectively. The perforations 17 are uniform, and their diameter is relatively small, for cutting and discharging the meat in hamburger size, for example. The perforations 17 reject larger bone particles. The side walls 44*b* and 44*c* of the bone-separation groove 44, however, are spaced apart for a greater distance than the diameter of the perforations 17, so as to accept both small bone particles and bone particles larger than the perforations.

Referring to FIG. 1, the stud 18 in the illustrative embodiment is an integral one-piece structure having a round-threaded portion 46 adjacent to one end thereof, an enlarged disk-like shoulder portion 48 adjacent to the threaded portion, an octagonal knife-mounting portion 50 adjacent to the shoulder portion, and a generally cylindrical shaft portion 52 adjacent to the knife-mounting portion and to the remaining end of the stud. The threaded portion 46 of the stud 18 is received in a complementary tapped hole 54 in the auger 14, as illustrated in FIG. 1, and the stud is turned into the auger until the rearmost convolution 14*a* of the auger abuts on the shoulder portion 48, which serves as a stop. The stud 18 is removably connected fixedly to the downstream end of the auger 14 in this manner.

The outside diameter of the stud shaft portion 52 is substantially equal to the inside diameter of the plate bearing bore 36, with suitable clearance, and the shaft portion is adapted to be received or journalled in the bearing bore for supporting the auger and the knife on the stud 18 and rotatably in the casing 12 and about the axis 15, as illustrated in FIG. 1. The knife 20 is supported in shearing relation to the upstream face 38 of the plate 16, the cutting edges 60 of the knife bearing on the upstream face. The position of the auger 14 along the axis 15 is adjustable, by conventional means not shown, for adjusting the force with which the knife 20 is urged against the plate 16.

The shaft portion 52 of the stud 18 when received in the bearing bore 36, and the walls 42*a* and 42*b* of the counterbore 42 define an annular bone-collecting pocket 56 (FIG. 1) around the shaft portion. The bone-separation groove 44 extends outwardly from the pocket 56, as described above for the relationship of the groove to the counterbore 42. The structure so far described is in accordance with the teachings of my U.S. Pat. No. 4,004,742.

In accordance with the present invention, additional structure is provided in the plate 16 to provide improvements in the removal or discharge of bone particles from the grinder 10. To this end, means defining a bone chip discharge passage 62 are provided radially offset from the bore 36. The discharge passage 62 extends from the bone collecting pocket 56 through the bottom wall 42*a* of the pocket and the full length of the hub 26 and out through the downstream end of the hub. As shown in FIG. 2, the passage 62 is in the form of a generally cylindrical second bore extending through the hub 26 with the entrance end of the passage 62 disposed substantially radially opposite the discharge end of the tangentially extending bone chip collecting groove 44 in the upstream face 38 of the die plate 16. Alternatively, as shown in FIG. 4, the discharge passage 62 may be formed with a generally arcuate or D-shaped cross-sectional shape.

In order to accommodate both the shaft journalling bore 36 and the discharge bore 62 in the hub 26 without unnecessarily reducing the number of perforations 17 that may be formed in the die plate 16, the hub 26 may advantageously be formed with its outer periphery somewhat eccentrically disposed with respect to the axis 15 of the die plate 16. Preferably, the outer periphery of the hub 26 is generally cylindrical in shape, although it will be appreciated that other cross sectional shapes may also be employed.

Pursuant to a further aspect of the invention a discharge tube 70 is provided having one end thereof 72 adapted to be secured around the downstream end of the hub 26 by suitable fastening means such as a hose clamp 74. The discharge tube 70 receives bone particles from the bone chip collecting pocket 56 in the die plate 16 and the discharge passageway 62 in the hub 26 and collects and deposits the bone chips from the opposite end 76 of the tube 70 separately from the ground meat that is discharged from the perforations 17 formed in the die plate 16 of the grinder 10. The free end 76 of the tube 70 may discharge the bone chips into any suitable container (not shown) provided for this purpose.

In operation, meat supplied to the auger 14 is driven past the rotary knife 20 and then against the upstream face 38 of the plate 16. Meat enters the perforations 17 in the plate, and the meat is sheared off at the surface of the upstream face 38 by the cutting edges 60 of the knife, rotating with the auger 14. The pressure in the grinding chamber 13*a* causes the thus-severed particles of meat, which are left within the perforations 17, to move through the perforations and be discharged therefrom at the downstream face 40 of the plate. The meat discharged from the perforations 17 is collected in a suitable container placed beneath the discharge end of the grinder.

Bone particles contained in the meat and which are of smaller size than the diameter of the plate perforations 17 may pass through the perforations together with the meat. Particles larger than and a portion of those smaller than the diameter of the perforations 17 are swept across the upstream face 38 of the plate 16 until they reach the bone-separation groove 44 in the plate. At this point, the pressure of the oncoming meat forces the bone particles into the groove 44, where they are collected and advanced along the groove in the direction of the counterbore 42 by the force of the cutting edges 60. Ultimately, the bone particles collect in the pocket 56. Meat particles forced into the groove 44 and the pocket 56 are forced or squeezed out of the groove and the pocket by the pressure exerted by the bone particles.

Under the pressure existing in the grinding chamber 13*a*, the bone particles which collect in the pocket 56 are forced into the discharge passage 62 and are conducted through the hub portion 26, and into the conduit 70, from whence they are discharged into a suitable collector. The passageway 62 or bore provided in the hub portion 26 constitutes the sole discharge passageway for bone particles from the channel 13 in the casing 12.

The collection of the bone particles in the pocket 56 is effective for producing a clean separation of bone particles from meat. The separation is regulated readily, by regulating the back pressure in the conduit 70 so as to regulate the discharge rate of the bone particles. The back pressure may be regulated merely by regulating the length of the conduit 70. Alternatively or in addition, back pressure may be regulated by employing a valve connected to the conduit 70. An increase in back pressure reduces the discharge rate, thereby increasing the proportion of bone particles and decreasing the proportion of meat which is collected in and discharged from the pocket 56. A relatively high back pressure may be maintained where the meat product is relatively low in bone content, and a relatively low back pressure may be maintained where the meat is relatively high in bone content, so as to maintain a high degree of separation of bone particles from meat. In this manner, the production of meat product low in bone content, with accompanying discharge of bone particles low in meat content, is readily achieved and controlled, simply and without need for additional parts of equipment.

The rotary knife 20 illustrated as being used in connection with the invention is but one of various knives which may be employed, including one-piece knives, knives with removable blades, and knives having from two to eight cutting arms, for example. Grinders of the type illustrated generally are employed with the casing 12 and the auger 14 extending horizontally, but the invention is not limited to extension of the casing and auger in any particular direction.

While preferred embodiments of the invention have been described and illustrated, it will be apparent to those skilled in the art that various changes and modifications in addition to those described above may be made therein within the spirit and scope of the invention.

I claim as my invention:

1. In a combination of a perforated plate adapted for being mounted to extend transversely in a tubular casing of a rotary meat grinder and for being fixedly secured to the casing, said plate including a perforated disk-like body portion having upstream and downstream faces and an integral generally culindrical hub portion projecting from the body portion in the downstream direction and having a first bore extending therethrough, and a stud having upstream and downstream ends and a cylindrical shaft portion adjacent to its downstream end adapted to be journalled for rotation in said bore, said stud having means adjacent to its upstream end for removably connecting the stud fixedly to the downstream end of an auger rotatable in the casing and having drive means intermediate its ends adapted to removably engage a rotary knife rotatable in the casing and interposed between the auger and the plate in shearing relation to the upstream face of the body portion of the plate, the improvement comprising the cylindrical hub being eccentrically disposed with respect to the central axis of said disk-like body portion.

said first bore extending through said hub being in line with the central axis of said disk-like body portion such that the cylindrical shaft journaled therein is centrally disposed relative to the disk-like body portion.

means defining a counterbore in said body portion adjacent to its upstream face and surrounding said first bore, said counterbore being defined by a cylindrical sidewall spaced radially from said first bore and a transverse bottom wall which together with said cylindrical shaft define an annular bone-collecting pocket.

means defining a discharge passage radially offset from said first bore and extending from said pocket directly through said bottom wall and said eccentric hub and out through the downstream end thereof, and a discharge tube having one end thereof adapted to be secured around the downstream end of said hub for receiving bone particles discharged from the grinder through said discharge passage in said hub.

said discharge tube and discharge passage being in direct and unobstructed communication, the opposite end of said tube being adapted to discharge the bone particles for collection separately from ground meat discharged from the perforations in said plate.

2. The combination defined in claim 1 wherein the upstream face of said plate is provided with a bone-receiving groove extending tangentially outwardly from said pocket, said groove having a width greater than the width of the plate perforations.

3. The combination defined in claim 1 wherein said discharge passage is defined by a second bore extending through said eccentric hub, said discharge passage being radially offset from said first bore thereby to effectively provide a discharge passage without the necessity of eliminating perforations in said plate.

4. The combination defined in claim 3 wherein said discharge passage has a generally arcuate cross-sectional shape.

5. The combination defined in claim 3 wherein the entrance end of said discharge passage is disposed substantially radially opposite the discharge end of said tangentially extending groove.

* * * * *